(12) United States Patent
Amershi et al.

(10) Patent No.: US 10,068,185 B2
(45) Date of Patent: Sep. 4, 2018

(54) ERROR-DRIVEN FEATURE IDEATION IN MACHINE LEARNING

(71) Applicant: Microsoft Technology Licensing, LLC., Redmond, WA (US)

(72) Inventors: Saleema Amershi, Seattle, WA (US); Michael J. Brooks, Seattle, WA (US); Bongshin Lee, Issaquah, WA (US); Steven M. Drucker, Bellevue, WA (US); Patrice Y. Simard, Clyde Hill, WA (US); Jin A. Suh, Seattle, WA (US); Ashish Kapoor, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 89 days.

(21) Appl. No.: 14/562,750

(22) Filed: Dec. 7, 2014

(65) Prior Publication Data

US 2016/0162803 A1 Jun. 9, 2016

(51) Int. Cl.
*G06F 11/00* (2006.01)
*G06N 99/00* (2010.01)
*G06F 11/16* (2006.01)
*G06F 11/07* (2006.01)
*G06F 17/30* (2006.01)

(52) U.S. Cl.
CPC ....... *G06N 99/005* (2013.01); *G06F 11/0787* (2013.01); *G06F 11/162* (2013.01); *G06F 17/30705* (2013.01)

(58) Field of Classification Search
CPC .................................................. G06F 11/0787

USPC .............................................. 714/26, 27, 25
See application file for complete search history.

(56) References Cited

U.S. PATENT DOCUMENTS

| | | | |
|---|---|---|---|
| 8,126,825 B2 | 2/2012 | Guyon | |
| 8,165,407 B1 | 4/2012 | Khosla et al. | |
| 8,190,537 B1 | 5/2012 | Singh et al. | |
| 2002/0147782 A1 | 10/2002 | Dimitrova et al. | |
| 2008/0104101 A1* | 5/2008 | Kirshenbaum ... | G06F 17/30539 |

(Continued)

FOREIGN PATENT DOCUMENTS

JP    2007-219947 A    8/2007

OTHER PUBLICATIONS

Amershi et al., "Power to the People: The Role of Humans in Interactive Machine Learning", Published on: Jul. 14, 2013, Available at: http://hci.uwaterloo.ca/faculty/elaw/cs889/reading/IML/2013AlMagIML.pdf.

(Continued)

*Primary Examiner* — Dieu-Minh Le
(74) *Attorney, Agent, or Firm* — Schwegman Lundberg & Woessner, P.A.

(57) ABSTRACT

Disclosed herein are technologies directed to a feature ideator. The feature ideator can initiate a classifier that analyzes a training set of data in a classification process. The feature ideator can generate one or more suggested features relating to errors generated during the classification process. The feature ideator can generate an output to cause the errors to be rendered in a format that provides for an interaction with a user. A user can review the summary of the errors or the individual errors and select one or more features to increase the accuracy of the classifier.

20 Claims, 8 Drawing Sheets

(56) References Cited

U.S. PATENT DOCUMENTS

| | | | | |
|---|---|---|---|---|
| 2010/0121566 | A1* | 5/2010 | Joshi | G01C 21/3461 701/533 |
| 2010/0150448 | A1* | 6/2010 | Lecerf | G06F 17/3061 382/190 |
| 2010/0152878 | A1* | 6/2010 | Chu | G05B 17/02 700/110 |
| 2011/0218950 | A1 | 9/2011 | Mirowski et al. | |
| 2012/0089387 | A1* | 4/2012 | Gamon | G06F 17/274 704/9 |
| 2012/0150773 | A1* | 6/2012 | DiCorpo | G06N 99/005 706/12 |
| 2012/0239668 | A1* | 9/2012 | Bhattacharyya | G06Q 10/10 707/754 |
| 2012/0311496 | A1 | 12/2012 | Cao et al. | |
| 2014/0279762 | A1* | 9/2014 | Xaypanya | G06N 3/08 706/12 |
| 2014/0365207 | A1* | 12/2014 | Convertino | G06F 17/2785 704/9 |
| 2016/0041824 | A1* | 2/2016 | Bostick | G06F 8/72 717/123 |

OTHER PUBLICATIONS

Amershi et al., "ReGroup: Interactive Machine Learning for On-Demand Group Creation in Social Networks", May 5, 2012, In Proceedings of ACM SIGCHI Conference on Human Factors in Computing Systems, 10 pp.
Bird et al., "Natural Language Processing with Python", Jul. 7, 2009, In Publication of O'Reilly Media Inc., 504 pp.
Blum et al., "Selection of Relevant Features and Examples in Machine Learning", Dec. 1997, In Journal Artificial Intelligence—Special Issue on Relevance, vol. 97, Issue 1-2, 24 pp.
Chuang et al., "Termite: Visualization Techniques for Assessing Textual Topic Models", May 21, 2012, In Proceedings of the International Working Conference on Advanced Visual Interfaces, pp. 74-77.
Collins et al., "Docuburst: Visualizing Document Content Using Language Structure", Jul. 2, 2009, In Proceedings of the 11th Eurographics / IEEE—VGTC Conference on Visualization, vol. 28, No. 3, 8 pp.
Collobert et al., "Natural Language Processing (Almost) from Scratch", Aug. 2011, In Journal of Machine Learning Research, vol. 12, pp. 2493-2537.
Coopersmith et al., "Dynamic Wordclouds and Vennclouds for Exploratory Data Analysis", Jun. 2014, In Proceedings of the Workshop on Interactive Language Learning, Visualization, and Interfaces, pp. 22-29.
Davis et al., "The Relationship between Precision-Recall and ROC Curves", Jun. 25, 2006, In Proceedings of the 23rd International Conference on Machine Learning, pp. 233-240.
Domingos "A Few Useful Things to Know About Machine Learning", Oct. 2012, In Proceedings of Communications of the ACM, vol. 55, Issue 10, pp. 78-87.
Elijah, "Tutorial: Quick Start to Error Analysis", Published on: Feb. 2, 2013, Available at: http://lightsidelabs.com/2013/02/22/tutorial-quick-start-to-error-analysis/.
Fogarty et al., "Toolkit Support for Developing and Deploying Sensor-Based Statistical Models of Human Situations", Apr. 28, 2007, In Proceedings of the SIGCHI Conference on Human Factors in Computing Systems, pp. 135-144.
Gleicher et al., "Visual Comparison for Information Visualization", Aug. 31, 2011, In Journal Information Visualization, vol. 10, Issue 4, 29 pp.
Hoferlin et al., "Inter-Active Learning of Ad-Hoc Classifiers for Video Visual Analytics", Oct. 14, 2012, In Proceedings of IEEE Symposium on Visual Analytics Science and Technology, 10 pages.
Joachims "Text Categorization with Support Vector Machines: Learning with Many Relevant Features", Apr. 21, 1998, In Proceedings of the 10th European Conference on Machine Learning, 7 pp.

Kosara et al., "Parallel Sets: Interactive Exploration and Visual Analysis of Categorical Data", Jul. 2006, In Proceedings of IEEE Transactions on Visualization and Computer Graphics, vol. 12, No. 4, 11 pp.
Kulesza et al., "Fixing the Program My Computer Learned: Barriers for End Users, Challenges for the Machine", Feb. 8, 2009, In Proceedings of the 14th International Conference on Intelligent User Interfaces, pp. 187-196.
Markovitch et al., "Feature Generation Using General Constructor Functions", Oct. 2002, In Journal of Machine Learning, vol. 49, Issue 1, 39 pp.
Mayfield et al., "LightSIDE: Text Mining and Machine learning User's Manual", Published on Nov. 3, 2014, Available at "http://www.cs.cmu.edu/~emayfiel/LightSIDE.pdf".
Migut et al., "Visual Exploration of Classification Models for Risk Assessment", Oct. 24, 2010, In Proceedings of IEEE Symposium on Visual Analytics Science and Technology, 8 pages.
Patel et al., "Investigating Statistical Machine Learning as a Tool for Software Development", Apr. 5, 2008, In Proceedings of the SIGCHI Conference on Human Factors in Computing Systems, pp. 667-676.
Patel et al., "Using Multiple Models to Understand Data", Jul. 16, 2011, In Proceedings of the Twenty-Second International Joint Conference on Artificial Intelligence, pp. 1723-1728.
Raghavan et al., "InterActive Feature Selection", Jul. 30, 2005, In Proceedings of the 19th International Joint Conference on Artificial Intelligence, 6pp.
Salton et al., "Term-Weighting Approaches in Automatic Text Retrieval", Nov. 3, 2014, In Proceedings of Information Processing & Management, vol. 24, No. 5, pp. 513-523.
Schuller et al., "Evolutionary Feature Generation in Speech Emotion Recognition", Jul. 9, 2006, In IEEE International Conference on Multimedia and Expo, pp. 5-8.
Scott et al., "Feature Engineering for Text Classification", Jul. 27, 1999, In Proceedings of the Sixteenth International Conference on Machine, 10 pages.
Sebastiani, "Machine Learning in Automated Text Categorization", Mar. 2002, In Journal ACM Computing Surveys, vol. 34, Issue 1, 47 pp.
Smith et al., "Using Gazetteers in Discriminative Information Extraction", Jun. 2006, In Proceedings of the Tenth Conference on Computational Natural Language Learning, pp. 133-140.
Stone et al., "A Computer Approach to Content Analysis: Studies using the General Inquirer System", May 1963, In Proceedings of the Spring Joint Computer Conference, 16 pp.
Stumpf et al., "Interacting Meaningfully with Machine Learning Systems: Three Experiments", Aug. 2009, In Journal International Journal of Human-Computer Studies, vol. 67, Issue 8, 31 pp.
Stumpf et al., "Toward Harnessing User Feedback for Machine Learning", Jan. 28, 2007, In Proceedings of the 12th International Conference on Intelligent User Interfaces, pp. 82-91.
Taboada et al., "Lexicon-Based Methods for Sentiment Analysis", Jun. 2011, In Journal Computational Linguistics, vol. 37, Issue 2, pp. 267-307.
Viegas et al., "Timelines: Tag Clouds and the Case for Vernacular Visualization", Jul. 2008, In Proceedings of Interactions—Changing Energy Use through Design, pp. 49-52.
Walsum et al., "Feature Extraction and Iconic Visualization", Jun. 1, 1996, In Proceedings of IEEE Transactions on Visualization and Computer Graphics, vol. 2, No. 2, 9 pp.
Williams, "Experimental Designs Balanced for the Estimation of Residual Effects of Treatments", Nov. 4, 2014, In Australian Journal of Scientific Research, vol. 2, Issue 2, 1 page.
Wolfinger et al., "Mixed Models: A Future Direction", Feb. 1991, In Proceedings of the Sixteenth Annual SAS Users Group Conference, pp. 1380-1388.
Brooks et al., "Featureinsight: Visual support of error-driven feature ideation in text classification," Oct. 25, 2015, Proceedings of the IEEE Conference on Visual Analytics Science and Technology (VAST), 8 pages.
Haffari et al., "Active learning for statistical phrase-based machine translation," Jan. 1, 2009, Proceedings NAACL '09, Proceedings of Human Language Technologies: The 2009 Annual Conference of

(56) References Cited

OTHER PUBLICATIONS the North America Chapter of the Association for Computational Linguistics, pp. 415-422, 9 pages.
PCT Search Report and Written Opinion for Application No. PCT/US2015/062852, dated Mar. 14, 2016, 15 pages.
Raghavan et al., "An interactive algorithm for asking and incorporating feature feedback into support vector machines," Jan. 1, 2007, Proceedings of the 30th Annual International ACM SIGIR conference on Research and Development in Information Retrieval, SIGIR '07, pp. 79-86, 8 pages.
The PCT Written Opinion of the International Preliminary Examining Authority for PCT application No. PCT/US2015/062852, dated Nov. 17, 2016, 8 pages.

* cited by examiner

ERROR-DRIVEN FEATURE IDEATION IN MACHINE LEARNING

BACKGROUND

Typically, featuring in text classification problems use automated approaches that generate large numbers of features. The most commonly used is "bag-of-words" or bag of n-grams, in which each feature corresponds to the presence or frequency of a specific word or n-word phrase in the document. Conventional bag-of-words approaches produce sparse feature sets with thousands to millions of dimensions. Large feature spaces require more training data to reduce the risk of over-fitting (which degrades classifier performance on new data) and have reduced interpretability. Because bag-of-words features and other automatically generated features do not employ human input, there are little opportunities to incorporate a user's domain knowledge. This results in high labeling and maintenance costs.

SUMMARY

Disclosed herein are technologies directed to implementations of a feature ideator. The feature ideator can facilitate the ideation and modification of features. The created and/or modified features can be applied to create a model in a machine learning (ML) process. In some examples, the technologies can use a classifier. The classifier can receive as an input training data and output a set of errors. An interface can be provided to a teacher that facilitates input from the teacher based on the set of errors. The input from the teacher can be used to retrain the classifier. The classifier can update the set of errors based on the received input from the teacher. In some examples, to increase the usability of the set of errors to the teacher, a visual summary of the errors can be rendered in the interface. A visual summary of errors may, in some instances, increase the ability of a user to sort through a relatively large sample set of errors.

This Summary is provided to introduce a selection of technologies in a simplified form that are further described below in the Detailed Description. This Summary is intended to be used as an aid in determining the scope of the claimed subject matter. The term "technologies," for instance, can refer to system(s), method(s), computer-readable media/instructions, module(s), algorithms, hardware logic (e.g., Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs)), and/or technique(s) as permitted by the context described above and throughout the document.

BRIEF DESCRIPTION OF THE DRAWINGS

The detailed description is described with reference to the accompanying figures. The same reference numbers in different figures indicate similar or identical items.

DETAILED DESCRIPTION

This disclosure is directed to technologies for the ideation and modification of features to be applied to a model using a feature ideator. The techniques and systems described herein can be implemented in a number of ways. Example implementations are provided below with reference to the following figures. The implementations, examples, and illustrations described herein can be combined.

Overview

This disclosure is directed to technologies for feature ideation in a machine learning system. According to various examples, the machine learning system utilizes a user interface to evoke input from a teacher (or user). Some examples utilize a human as the teacher, whereas some examples utilize various computing processes as the teacher, and some examples utilize combinations thereof. According to some examples, the user interface is designed to present candidate features for consideration by the user.

The candidate features are generated by the machine learning system when the machine learning system classifies a training set of data. The training set of data can include, but is not limited to, textual data, documents, video data, audio data, pictorial data, and various combinations thereof. One or more errors, or terms associated with the errors, resulting from the classification of the training set of data are presented to the user via the user interface. The candidate features displayed in the user interface may be selected by the machine learning system based on various criteria. A selection of one or more candidate features can be received by machine learning system. The selected candidate features are used by the machine learning system as inputs for subsequent classification operations. In some examples, further iterations of candidate feature selection and the retraining of the machine learning system increases the accuracy of the machine learning system in classifying the training set of data.

Some examples can provide assistance to a user (or teacher) to determine one or more features to be applied to create a model. Such assistance can include the identification of candidate features that can help the user contemplate features for the model. The assistance can also include a user interface that displays information and provides selectable controls that help guide the user. These aspects can result in more accurate output from the computer. Examples can also train a classifier that is applied to the model in a manner that lowers computing usage and/or reduces usage of network bandwidth.

The techniques and systems described herein may be implemented in a number of ways. Example implementations are provided below with reference to the following figures. The implementations, examples, and illustrations described herein may be combined.

Example Environment

Figure 1:
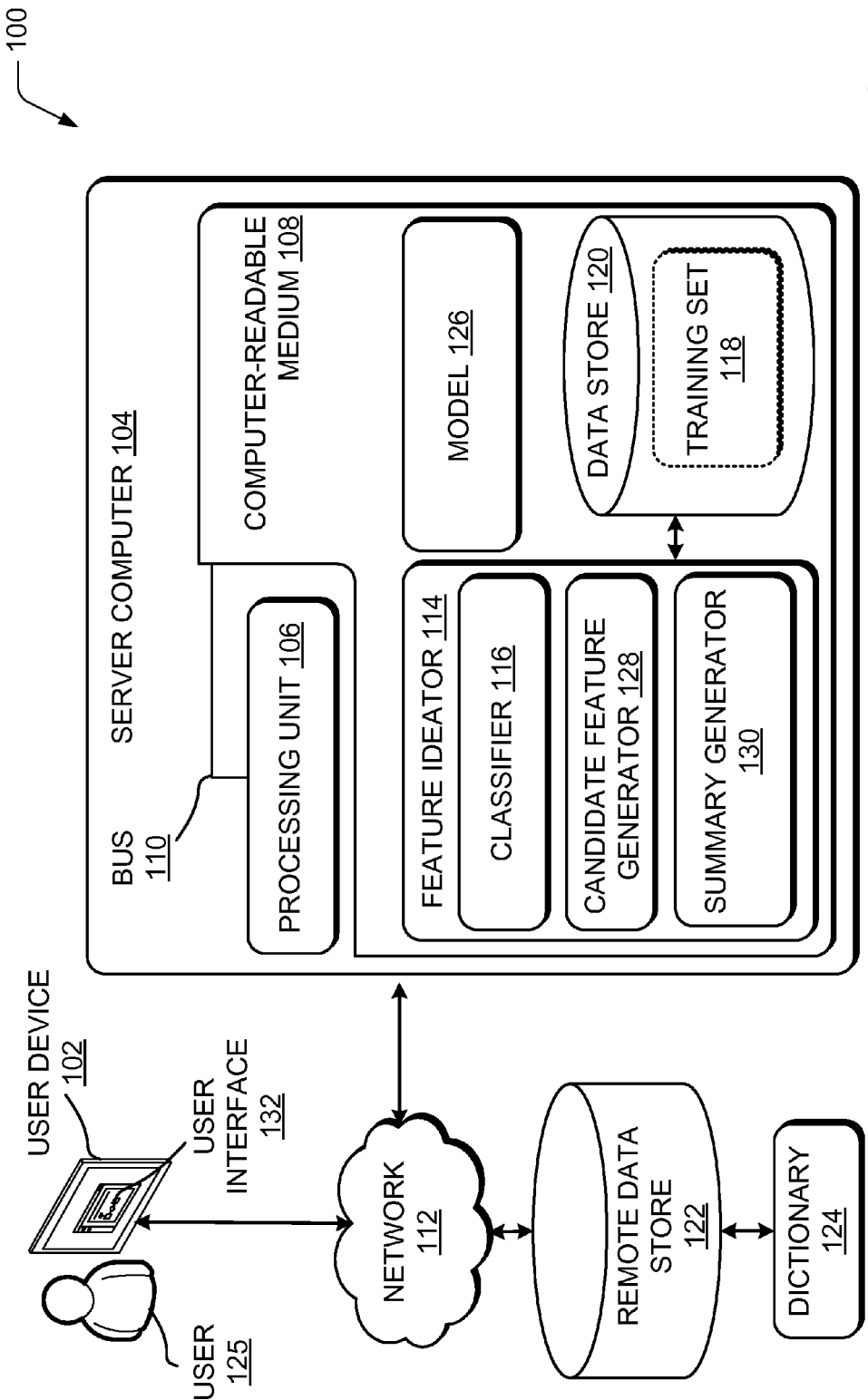
FIG. 1 is a block diagram depicting an example environment in which examples of a feature ideator can operate.

FIG. 1 is a block diagram depicting an example environment 100 in which examples described herein can operate. The environment 100 can include a user device 102 and a server computer 104. The user device 102 and/or the server computer 104, in some examples, are part of a distributed computing architecture. In some configurations, the user device 102 and/or the server computer 104 are devices.

Although not limited to any particular configuration, a device can include a stationary device, a mobile device, or an embedded device.

Examples of a stationary device include, but are not limited to, desktop computing devices, server computing devices, a dedicated gaming console, and the like. Examples of mobile devices include, but are not limited to, a laptop computer, a notebook computer, an ultra-portable computer, a netbook computer, or a computing device such as a "smart" mobile telephone, a tablet device, a slate device, a portable video game device, or the like. Examples of embedded devices include, but are not limited to, internet-enabled televisions, automobiles, appliances, and the like. In this regard, it should generally be appreciated that the hardware components, including the user device 102 and the server computer 104, are merely illustrative and that the embodiments described herein might be implemented using other types of hardware devices. The server computer 104 can have a processing unit 106 operably connected to a computer-readable media 108 via a bus 110. The computer-readable media 108 stores computer-executable instructions for implementing various technologies described herein.

The user device 102 is in communication with a server computer 104 via network 112. It should be appreciated that technologies described herein are not limited to requiring that the user device 102 to be in communication with server computer 104 via the network 112, as aspects described herein can be implemented fully or partially on the user device 102 without the server computer 104.

Technologies described herein are not limited to any particular type of networking implementation for the network 112. For example, network 112 can include public networks such as the Internet, private networks such as an institutional and/or personal intranet, or some combination of private and public networks. The network 112 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. The network 112 can utilize communications protocols, including packet-based and/or datagram-based protocols such as internet protocol (IP), transmission control protocol (TCP), user datagram protocol (UDP), or other types of protocols. Moreover, the network 112 can also include a number of devices that facilitate network communications and/or form a hardware basis for the networks, such as switches, routers, gateways, access points, firewalls, base stations, repeaters, backbone devices, and the like.

In some examples, the network 112 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 1302.11 standards (e.g., 1302.11g, 1302.11n, and so forth), and other standards.

In one implementation, the server computer 104 executes a feature ideator 114. The feature ideator 114 can be used to generate and/or modify one or more features to train a classifier 116. The classifier 116 can receive as an input a training set of data 118. The training set of data 118 is the corpus of data used by the classifier 116. In some examples, the data is textual data. In other examples, the data can be audio or visual data. The presently disclosed subject matter is not limited to any particular type of data used by the feature ideator 114. The training set of data 118 can be stored in a data store 120 or a remote data store 122, or combinations thereof. The training set of data 118 can be generated in various ways. In some examples, the training set of data 118 can be part of a dictionary 124 of textual data stored in the remote data store 122. In some examples, the dictionary 124 (or lexicon) can be a group of words or n-grams that are used together to form a feature. For example, if a dictionary containing one word for every word was created, the dictionary features could be the same as Bag-of-Words. When a teacher selects words or n-grams using feature ideation, the teacher can group these words or n-grams into dictionaries to create the features. For instance, if feature ideation suggests the word "car", the teacher can put "car," "cars," "automobile," and "automobiles" together in a "dictionary." The resulting feature would can count the term frequency of word "car" in a document, but also count all the other terms and sum them together to represent the car "concept."

A user 125, acting as a teacher to the feature ideator 114, can initiate the feature ideator 114 to generate a model 126 to be applied in various ways to different sets of data. The model 126 can include, or be constructed from, various components or inputs, such as the classifier 116. The feature ideator 114 can access one or both of the data store 120 or the remote data store 122 (as applicable) to receive the training set of data 118. In some examples, the training set of data 118 includes textual data that has been deconstructed into constituent components. For example, the training set of data 118 can include phrases of two or more words. A portion, or all, of the phrases can be deconstructed to the individual words of the phrases rather than the phrases themselves. It should be appreciated, however, that the presently disclosed subject matter is not limited to deconstructed training sets of data. In some examples, the training set of data 118 is labeled. In some examples, a label can include a tag, descriptor, class, or other information applicable to the data. Thus, in some examples, the training set of data 118 can include labeled textual data.

The feature ideator 114 can cause the classifier 116 to analyze at least a portion of the training set of data 118. The analysis of the training set of data 118 by the classifier 116 can create one or more errors. As used herein, an error is generated when the classifier 116 classifies a data point of the training set of data 118 differently than how the data point is labeled. In some instances, it can be preferable to reduce the number of errors generated by the classifier 116 when analyzing the portion of the training set of data 118. A reduction in the number of errors can increase the usefulness and effectiveness of the model 126.

The feature ideator 114 can initialize a candidate feature generator 128. The candidate feature generator 128 can analyze the errors and determine one or more terms that can correct the error. The one or more terms that can correct the error are candidate features. If a candidate feature is selected by a teacher, such as the user 125, the candidate feature can be applied as an input to the model 126 as an applied feature. The candidate feature generator 128 can also be used to generate contrast terms. In some examples, the contrast terms are terms that do not generate an error.

The feature ideator 114 can also initiate a summary generator 130. The summary generator 130 can identify a determined number of candidate features or contrast terms to be displayed. The displayed candidate features or contrast terms can be selected by the summary generator 130 using various criteria. In one example of the criteria, the displayed candidate features or contrast terms can be selected based on an expected increase in accuracy of the classifier if a particular candidate feature or contrast term is selected as a feature. An example process using the summary generator 130 is described in FIG. 8, below.

As noted briefly above, the feature ideator 114 can be used to generate a feature. The feature can be applied to the classifier 116 as an applied feature to train the classifier 116. Training the classifier 116 can increase the efficiency and accuracy of the model 126 that uses the information provided by the classifier 116. The feature ideator 114 can receive as an input selections provided by the user 128. The feature ideator 114 can provide information to render a feature ideation user interface 132, an example of which is described in FIGS. 3-6, in a display of the user device 102.

The feature ideator 114 can apply the classifier 116 to the training set of data 118 to generate one or more terms (candidate features) associated with errors generated when the classifier 116 is applied to the training set of data 118. The feature ideator 114 can cause the rendering of the candidate features in the feature ideation user interface 132. The feature ideator 114 can receive an input of a selection of one or more of the candidate features and input the selected one or more candidate features as applied features to the classifier 116 to retrain the classifier 116. These and other aspects of the feature ideator 114 are explained in additional detail with regard to the following figures.

Example Architecture

Figure 2:
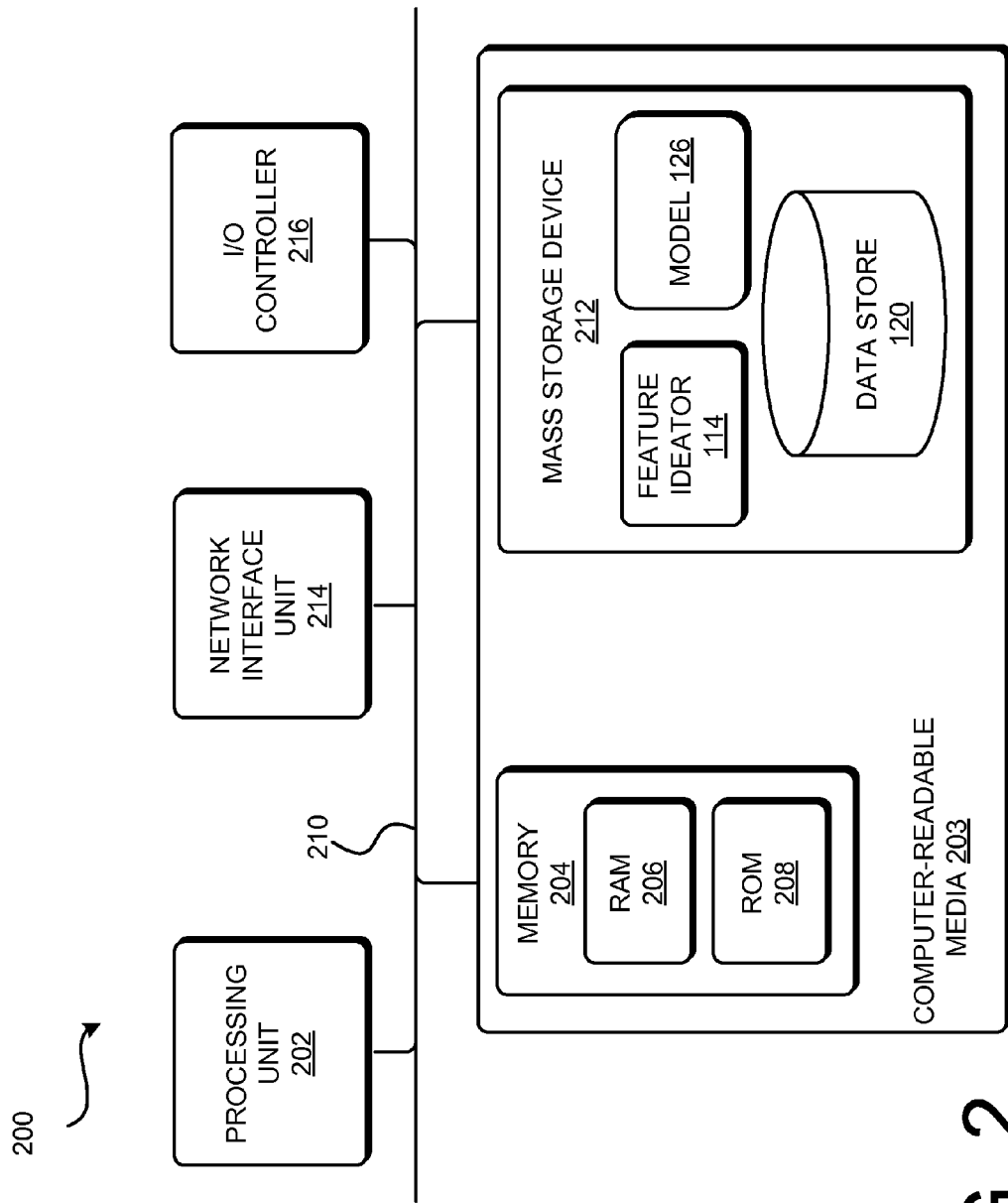
FIG. 2 is a block diagram depicting an illustrative device capable of implementing aspects of the embodiments presented herein.

FIG. 2 shows an illustrative device 200, which can represent the user device 102 or the server computer 104. The illustrative device 200 can be utilized to execute any aspects of the software components presented herein. The illustrative device 200 illustrated in FIG. 2 can include any type of computing device having a central processing unit (CPU) 202, such as the processing unit 106, operable connected to a computer-readable media 203, such as the computer-readable medium 108. The computer-readable media 203 can include a system memory 204, including a random access memory 206 (RAM) and a read-only memory (ROM) 208. A system bus 210 couples the computer-readable media 203 to the CPU 202. A basic input/output system containing the basic routines that help to transfer information between elements within the illustrative device 200, such as during startup, is stored in the ROM 208. The computer-readable media 203 further includes a mass storage device 212 to store computer-executable instructions for implementing one or more application programs including, but not limited to, the feature ideator 114. The mass storage device 212 can also have stored therein computer-executable instructions for implementing the model 126 and the data store 120. Computer-executable instructions can be implemented on various system configurations, including single-processor or multiprocessor systems, single core or multi-core processors, minicomputers, mainframe computers, personal computers, hand-held computing devices, microprocessor-based, programmable consumer electronics, combinations thereof, and the like.

The mass storage device 212 can be connected to the CPU 202 through a mass storage controller (not shown) connected to the bus 210. The mass storage device 212 and its associated computer-readable media can provide non-volatile storage for the illustrative device 200. Although the description of computer-readable media contained herein refers to a mass storage device, such as a hard disk or CD-ROM drive, it should be appreciated by those skilled in the art that computer-readable media can include any available computer storage media or communication media that can be accessed by the illustrative device 200.

Communication media includes computer readable instructions, data structures, program modules, or other data in a modulated data signal such as a carrier wave. As used herein, the term "modulated data signal" means a signal that has one or more of its characteristics changed or set in a manner as to encode information in the signal. By way of example, and not limitation, physical components that enable operation of communication media include wired media such as a wired network or direct-wired connection and wireless media such as acoustic, RF, infrared and other wireless media. Combinations of the any of the above should also be included within the scope of computer-readable media.

By way of example, and not limitation, computer storage media can include volatile and non-volatile, removable and non-removable media implemented in any method or technology for storage of information such as computer-executable instructions, data structures, program modules or other data. For example, computer storage media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and which can be accessed by the illustrative device 200. As used herein, "computer storage media" does not include "communication media."

According to various embodiments, the illustrative device 200 can operate in a networked environment using logical connections to remote computers through a network, such as the network 112. The illustrative device 200 can connect to the network 112 through a network interface unit 214 connected to the bus 210. It should be appreciated that the network interface unit 214 also can be utilized to connect to other types of networks and remote computer systems. The illustrative device 200 also can include an input/output controller 216 for receiving and processing input from a number of sources including other devices, such as a keyboard, mouse, electronic stylus, camera, touch interface, etc. Similarly, the input/output controller 216 can provide an output to a display screen, a printer, or other type of output device.

It should be appreciated that the software components described herein may, when loaded into the CPU 202 and executed, transform the CPU 202 and the overall illustrative device 200 from a general-purpose computing system into a special-purpose computing system customized to facilitate the functionality presented herein. The CPU 202 can be constructed from any number of transistors or other discrete circuit elements, which can individually or collectively assume any number of states. More specifically, the CPU 202 can operate as a finite-state machine, in response to executable instructions contained within the software modules disclosed herein. These computer-executable instructions can transform the CPU 202 by specifying how the CPU 202 transitions between states, thereby transforming the transistors or other discrete hardware elements constituting the CPU 202.

Encoding the software modules presented herein also can transform the physical structure of the computer-readable media presented herein. The specific transformation of physical structure can depend on various factors, in different implementations of this description. Examples of such factors can include, but are not limited to, the technology used to implement the computer-readable media, whether the computer-readable media is characterized as primary or secondary storage, and the like. For example, if the computer-readable media is implemented as semiconductor-based memory, the software disclosed herein can be encoded on the computer-readable media by transforming the physical state of the semiconductor memory. For example, the software can transform the state of transistors, capacitors, or other discrete circuit elements constituting the semiconductor memory. The software also can transform the physical state of such components in order to store data thereupon.

As another example, the computer-readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations also can include altering the physical features or characteristics of particular locations within given optical media, to change the optical characteristics of those locations. Other transformations of physical media are possible without departing from the scope and spirit of the present description, with the foregoing examples provided only to facilitate this description.

In light of the above, it should be appreciated that many types of physical transformations take place in the illustrative device 200 in order to store and execute the software components presented herein. It also should be appreciated that the illustrative device 200 can include other types of computing devices, including hand-held computers, embedded computer systems, personal digital assistants, and other types of computing devices known to those skilled in the art. It is also contemplated that the illustrative device 200 may not include all of the components shown in FIG. 2, can include other components that are not explicitly shown in FIG. 2, or can utilize an architecture different than that shown in FIG. 2.

Example User Interfaces

Figure 3:
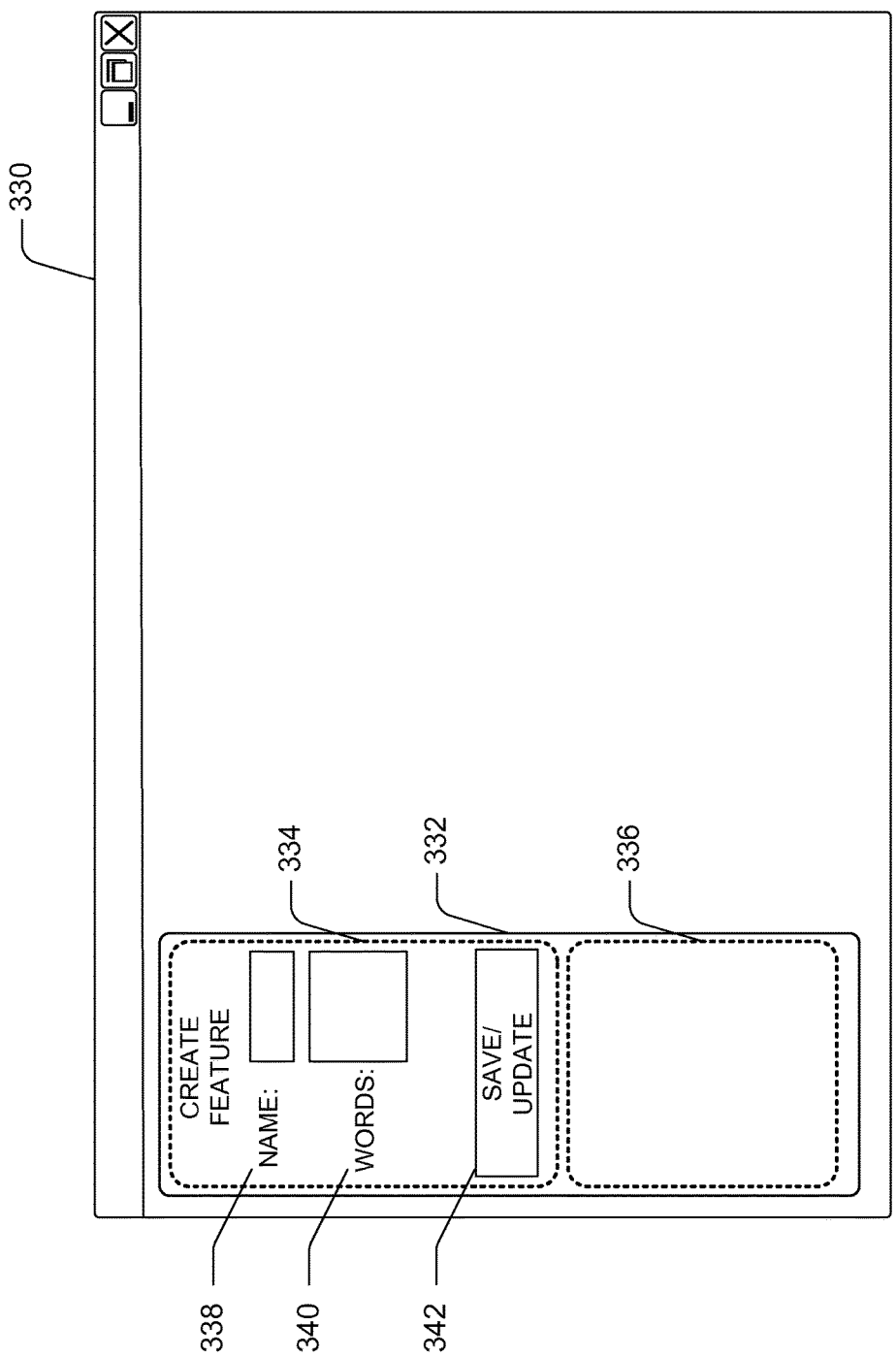
FIGS. 3-6 are diagrams depicting the use of a feature ideation user interface.

FIGS. 3, 4, 5, and 6 illustrate examples user interfaces depicting aspects of visual support for error-driven feature ideation in machine learning. FIG. 3 is a diagram of a feature ideation user interface 330 that can be used to interact with the feature ideator 114 to generate and/or modify applied features. The feature ideation user interface 330 can be rendered in a display, such as the display for the user device 102 of FIG. 1. The feature ideation user interface 330 can include a featuring area 332. The featuring area 332 can include a create feature section 334 and an applied feature section 336. The applied feature section 336 can include one or more features that have been identified and selected to be applied to the training set of data 118.

The create feature section 334 can be used by a user in the process of creating one or more features to train the classifier 116. The create feature section 334 can include a name area 338. In some examples, the classifier 116 can analyze previously unanalyzed data or analyze data to which no applied features have been identified. To provide some input (or direction) to the classifier 116, a name (or other text) can be provided. For example, it can be desired to train the classifier 116 to classify terms associated with bicycling. A user can input a term into the name area 338 to "seed" or commence the classification. It should be understood, however, that various implementations of the presently disclosed subject matter do not require a seed term or any other term to commence the classification of the training set of data 118.

The name area 338 can also be used to identify a particular model 126 to be created. For example, a user can input "bicycle web pages" in the name area 338 and select the save/update feature 342 to save the inputted "bicycle web pages" as the particular model 126 being created or modified. The user can also input terms in the words area 340 that can be useful for the classifier 116 to begin or continue its classification and error identification process. For example, a user can input in the word area 340 terms such as "bicycle," "mountain bike," and "pedal." The user 125 (or teacher) can select the save/update feature 342 to cause the classifier 116 to analyze the training set of data 118 and generate one or more candidate features based on errors determined in the analysis, illustrated in further detail in FIG. 4.

Figure 4:
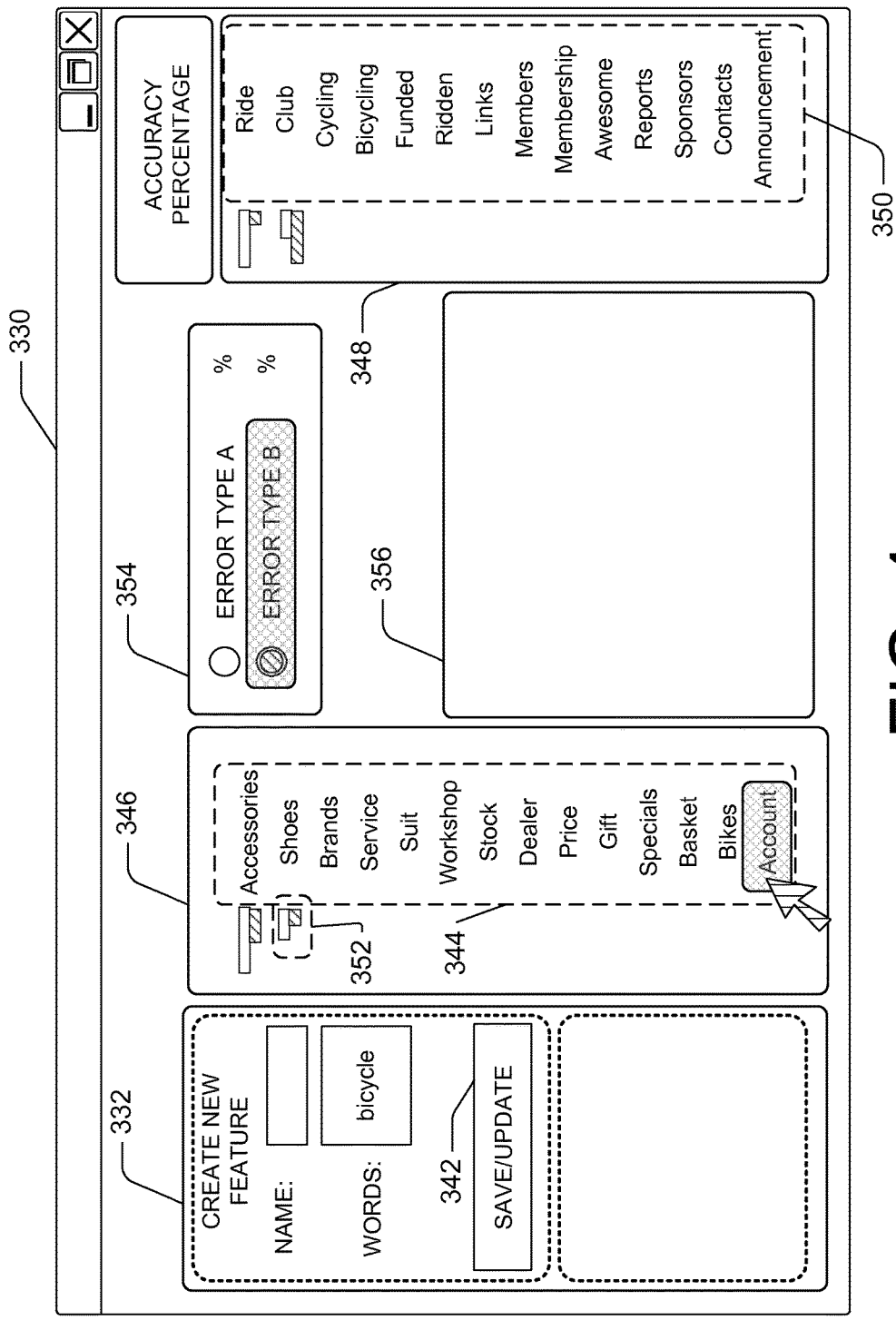

FIG. 4 is a diagram of the feature ideation user interface 330 depicting candidate features 344 generated by the feature ideator 114. The candidate features 344 are rendered in candidate feature section 346. The candidate features 344 can include one or more terms associated with errors determined when the classifier 116 analyzes the training set of data 118. The candidate features 344 can be generated through various processes, such as the routine described in FIG. 8, below. In some examples, however, the candidate features 344 are one or more terms associated with an error determined when the classifier 116 classifies the designated portion of the training set of data 118. The terms comprising the candidate features 344 can be terms associated with the errors. The presently disclosed subject matter is not limited to any particular manner in which the candidate features 344 are generated.

In the example illustrated in FIG. 4, the feature ideator 114 initiates the classifier 116. The classifier 116 is directed to classify at least a portion of the training set of data 118. It should be understood that in some examples, only a portion of the training set of data 118 is classified.

Although there can be various reasons to classify only a portion, one reason can be that the size of the training set of data 118 precludes a relatively fast or acceptable response time. The presently disclosed subject matter is not limited to any particular sample size or portion of the training set of data 118. Further, the presently disclosed subject matter is not limited to a single training set of data, as the classifier 116 can receive as an input several different training sets of data. These and other variations are considered to be within the scope of the presently disclosed subject matter.

Returning to FIG. 4, upon classification of the particular training set of data 118, the candidate feature generator 128 analyzes the results of the classifier and generates one or more candidate features 334 for rendering in the candidate feature section 346. The candidate features 334 a portion of candidate features selected from a larger group of candidate features. Although not limited to any particular reason for the selection of one candidate feature over another, there can be various reasons for doing so. For example, some candidate features 344 may, if selected as a feature, correct a larger number of errors than other candidate features. In another example, some candidate features can be highly relevant to the particular model being developed over other candidate features. The presently disclosed subject matter is not limited to any particular reason for the selection of candidate features 344 for display in the candidate feature section 346.

In some examples, the candidate features 344 can be rendered in a manner that indicates a ranking. The candidate features 344 can begin with candidate features that rank higher on some criteria than candidate features near the end of the rendered candidate features 344. For example, the candidate feature "Accessories" can represent a relatively significant error, whereas the candidate feature "Account" can represent a relatively smaller error. The ranking can help draw the attention of a user to more relevant or impactful features (e.g. a large effect on correcting errors), while still providing lower ranked features for additional information. The candidate features 344 can be ranked and displayed in a manner that indicates their ranking. For example, candidate features 344 having a relatively higher ranking can be rendered in a larger font or be rendered at the top of a list over other, lower ranked candidate features 344. The presently disclosed subject matter is not limited to any particular ranking methodology or the manner in which the ranking is represented in a user interface.

In some examples, the feature ideator 114 can also cause to be rendered a contrast term section 348. The contrast term section 348 can include one or more contrast terms 350. Although not limited to any particular categorization, the contrast terms 350 can be one or more terms properly classified. These contrast terms 350 may, in some examples, be a source of additional information for the user to determine one or more features to train the classifier 116, acting in a manner similar to the candidate features 344.

The contrast terms 350 can be ranked and displayed in a manner that indicates their ranking. For example, contrast terms 350 having a relatively higher ranking can be rendered in a larger font or be rendered at the top of a list over other, lower ranked contrast terms 350. The presently disclosed subject matter is not limited to any particular ranking methodology or the manner in which the ranking is represented in a user interface. The contrast terms 350 can be generated through various processes, such as the routine described in FIG. 7, below.

In some examples, other than ranking or otherwise differentiating between different members of each, additional information can be provided about either the candidate features 344 or the contrast terms 350. In one example, a frequency indicator 352 can be rendered proximate to one or more of the terms in either the candidate features 344 or the contrast terms 350.

Documents (or other types of data) can be classified in various ways. In some implementations, documents can be classified as positive or negative. In some examples, positive documents are documents that the classifier 116 determines meets the requirements of the model 126. In further examples, negative documents are documents that the classifier 116 determines does not meet the requirements of the model 126. The frequency indicator 352 can include a top bar having a certain length that indicates the frequency of the particular term in positive documents. The frequency indicator 352 can also include a lower bar having a certain length that indicates the frequency of the particular term in negative documents. High frequency terms, terms having larger bars, can provide a better generalization; terms with large differences in bar length can help the classifier 116 discriminate between positives and negatives.

In some examples, the particular term in either the candidate features 344 or the contrast terms 350 can be selectable, or another interface provided, that, when selected, gives additional information regarding the calculation of the particular bar length. For example, a selection of the term "Shoes," associated with the delineated frequency indicator 352, can bring up an example web page with a high term frequency-inverse document frequency (tf-idf) value for the selected word. In some examples, the additional information can help provide context to the user for the calculation of the particular bar length of the frequency indicator 352. In some examples, the particular bar length of the frequency indicator 352 can be used to display an estimated impact of adding the candidate feature as an applied feature.

In some classification operations, there can be different error types associated with the errors determined using the classifier 116. In some examples, the types of errors can be generated by binary classifiers. In some binary classifiers, the errors can be designated as "false positives," or "false negatives." False positives can be errors in which a positive result is detected when a negative result should have been the result. False negatives can be errors in which a negative result is detected when a positive result should have been the result.

Because the space of positive documents can have a defined concept, while the space of negative documents is typically more open-ended and diverse, these two types of errors can require different types of features to address. For example, a feature describing what an item "is" can be different than a feature describing what something "is not." The focus selection control 354 can include "Error Type A," which can correspond to false positives. The focus selection control 354 can also include "Error Type B," which can correspond to false negatives. A user can switch between the two different error types. In some examples, a percentage can be associated with each of the error types to guide a user in determining which error type to focus on. For example, the percentage can be associated with the percent of documents the classifier 116 is classifying correctly in each error type.

In some examples, the terms in either the candidate features 344 or the contrast terms 350 may provide suggestions of words for the user 125 add to the create feature section 334. In the example illustrated in FIG. 4, an input has been received in the create feature section 334 that the user 125 has added the term "bicycle" to be an applied feature.

In some instances, a user can attempt to create a large set of one-word dictionaries. While this large set can result in improvements on the training set of data 118, the large set can result in poor generalization of the model to data outside of the training set of data 118. In some examples, therefore, it can be desirable to prompt to the user to explore semantically-related words to words rendered in either the candidate features 344 or the contrast terms 350. An input can be received that a selection of a term has occurred in either the candidate features 344 or the contrast terms 350.

In the example illustrated in FIG. 4, an input has been received that indicates that a user has selected the term "Account" in the candidate features 344 for additional exploration. A list of related words can be determined and rendered in the related terms section 356, described in more detail in FIG. 5, below.

Figure 5:
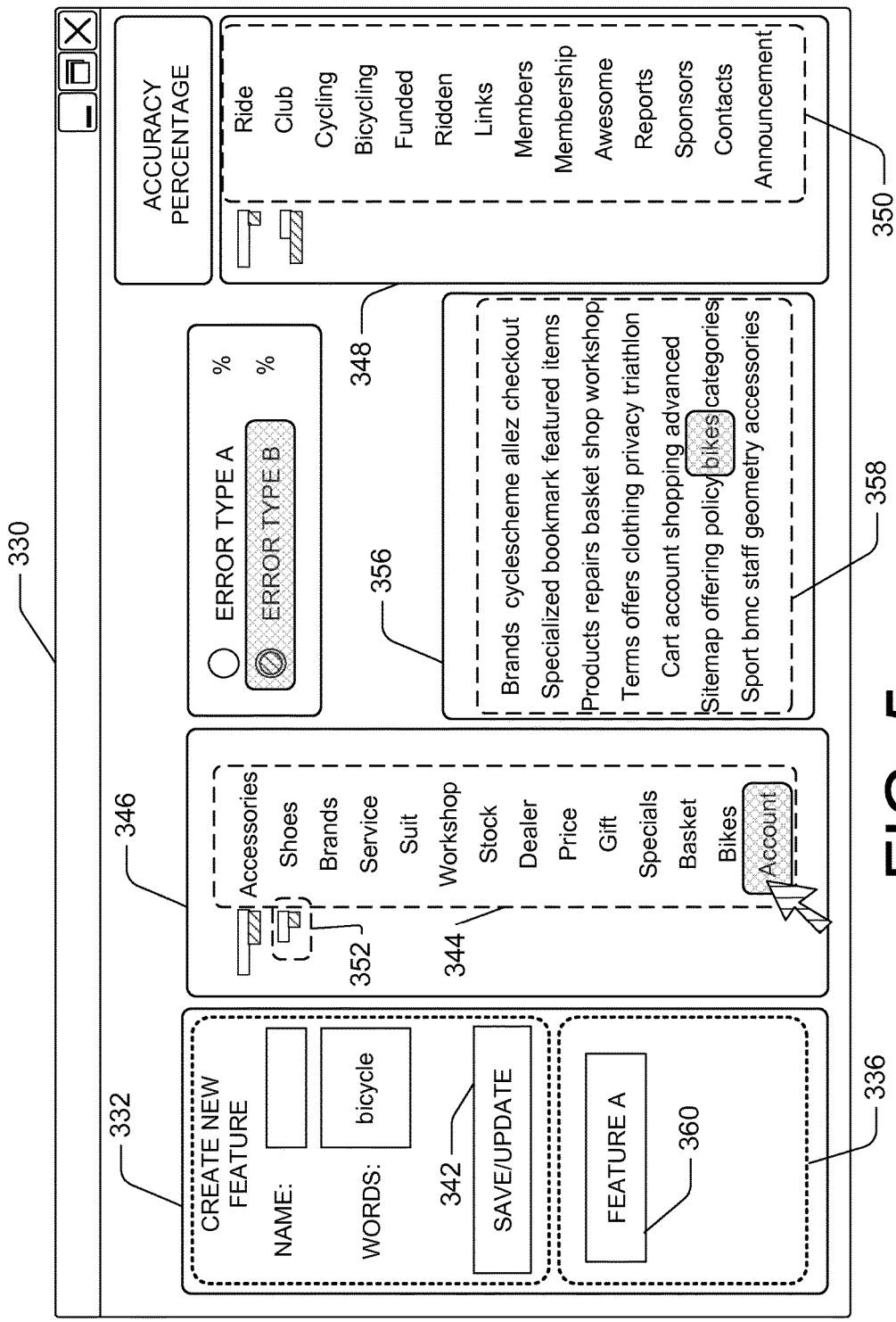

FIG. 5 is a diagram of the feature ideation user interface 330 depicting semantically-related word generation. In FIG. 5, an input has been received that a selection of the term "Account" in the candidate features 344 has occurred. In response to the receipt of the selection of the term, one more related terms 358 can be rendered in a related terms section 356 of the feature ideation user interface 330. In some examples, the terms received from the user 125 in the create new feature section 334 can be used as an input to generate the terms rendered in the related terms section 356.

In some examples, the feature ideator 114 can generate a vector for each word containing the word's tf-idf value for each document in the training set of data 118. The cosine distance between the vectors can then be used to measure similarity between the words. In some instances, a certain number, such as the top 25, with the smallest cosine distance to the selected word can be rendered in the related terms section 356 of the feature ideation user interface 330. Words in the related terms section 356 that are already features can be differentiated from other words. In the example illustrated in FIG. 5, the term "bikes" in the related terms section 356 is already a feature and has been highlighted to reduce the probability of idealizing redundant features.

The terms in either the candidate features 344, the contrast terms 350, or the related terms 358 can be helpful to a user to idealize (or come up with) a feature to be applied to the model 126. In the example illustrated in FIG. 5, the user has determined that a feature A 360 is to be an applied feature of the model 126. The feature A 360 is rendered in the applied feature section 336 of the feature ideation user interface 330. As the user progresses, the user can add additional features as applied features, described in more detail in FIG. 6, below.

Figure 6:
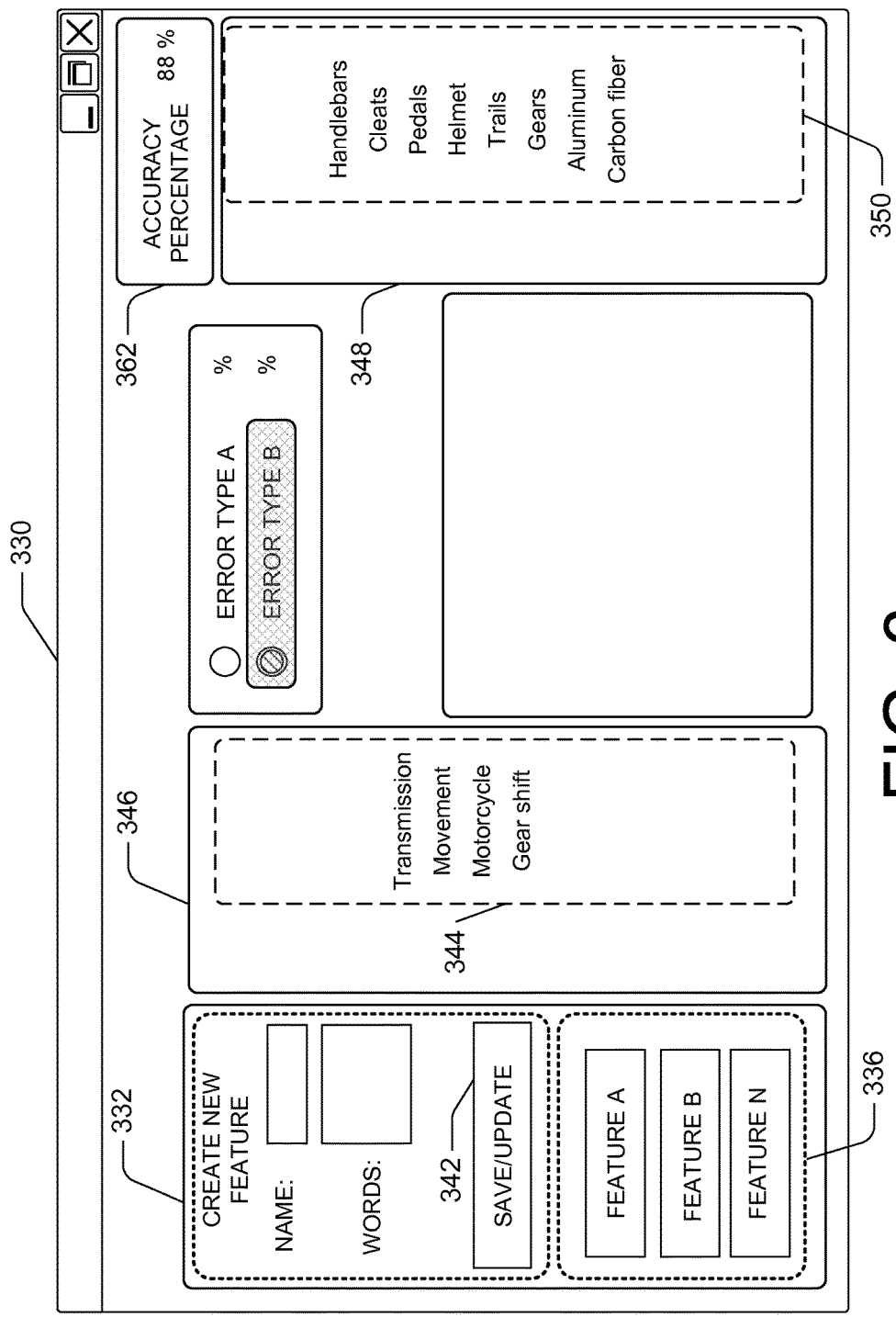

FIG. 6 is a diagram of the feature ideation user interface 330 depicting the addition of features as applied features. In FIG. 6, the applied feature section 336 has been updated from FIG. 5 with additional features identified by the user. The additional applied features are feature B and feature N, both rendered with the feature A in the applied feature section 336.

In FIG. 6, the classifier 116 has been retrained through the selection of the save/update feature 342. When the save/update feature 342 is selected, a new set of candidate features 344 can be rendered in the candidate feature section 346. In some examples, when the save/update feature 342 is selected, a new set of contrast terms 350 can be rendered in the contrast term section 348.

Among other possible uses, to help guide a user in the feature ideation process, the feature ideation user interface 330 can also include an accuracy percentage indicator 362. The accuracy percentage indicator 362 can illustrate the current accuracy of the classifier 116. The accuracy of the classifier 116 can be determined using various technologies. In some examples, the accuracy of the classifier 116 can be a percentage of the data of the training set of data 118 accurately classified by the classifier 116 according to the labelling applied to the training set of data 118. As the number of errors in the classification by the classifier 116 decreases, the classifier 116 accuracy increases. A user (or other entity) can use the accuracy to determine features that increase the accuracy of the classifier 116 while avoiding the application of features that decrease the accuracy of the classifier 116.

Example Processes

Figure 7:
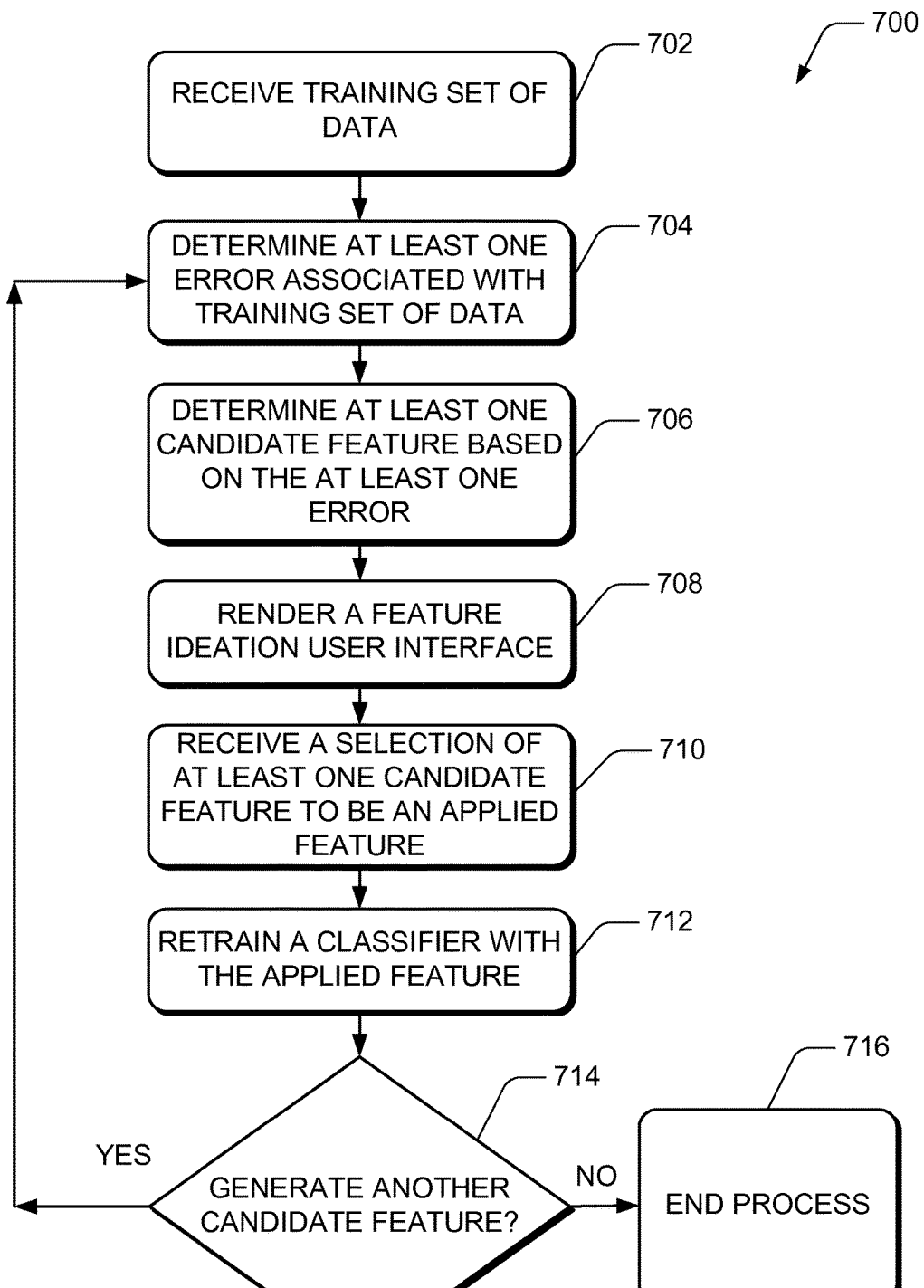
FIG. 7 is a flow diagram depicting an example feature ideation routine.
Figure 8:
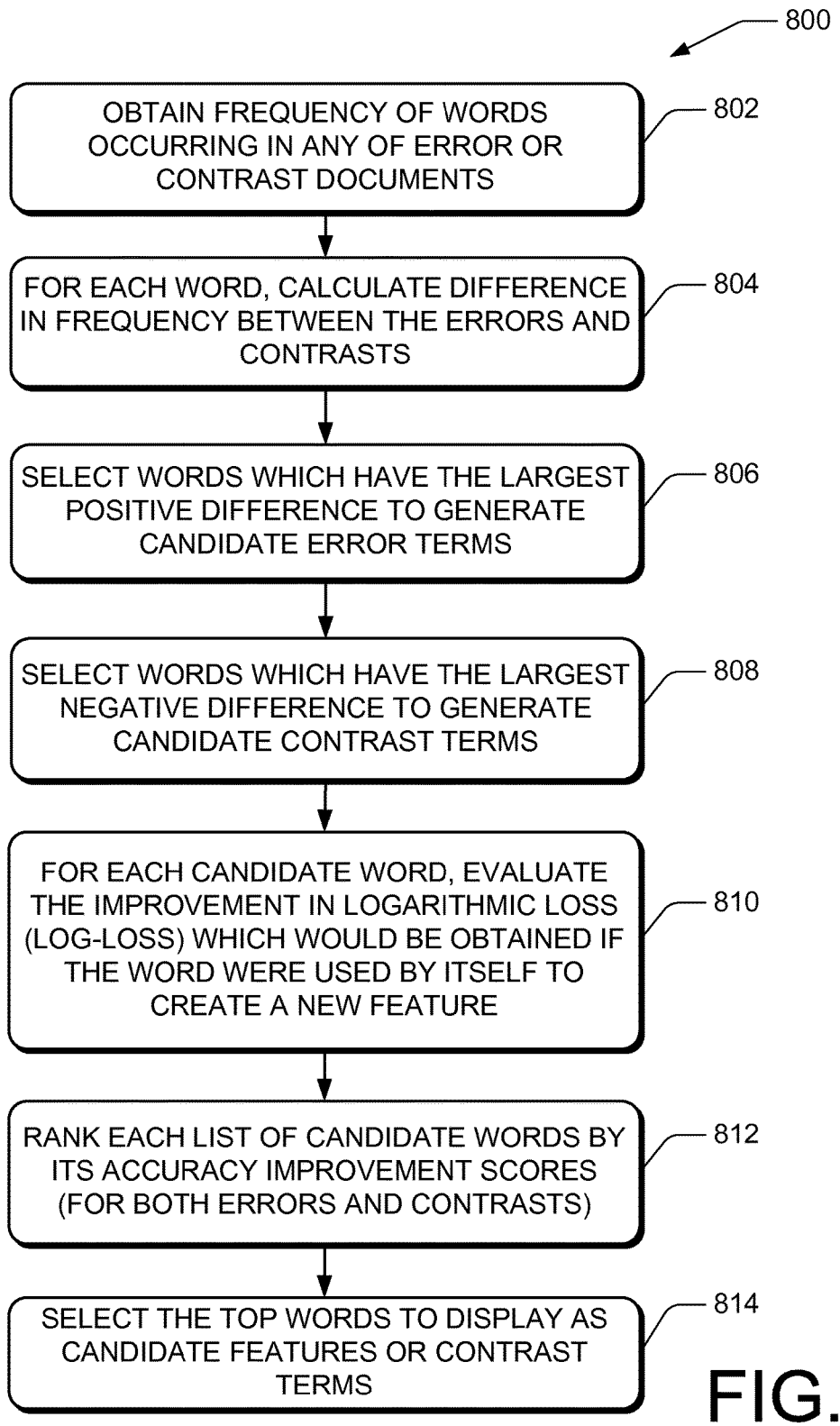
FIG. 8 is a flow diagram illustrating an example process for generating candidate terms for error and contrast portions of a user interface, such as the feature ideation user interface of FIGS. 3-6.

FIGS. 7 and 8 are flow diagrams depicting aspects of visual support for error-driven feature ideation in machine learning. The operations of the routines disclosed herein are not necessarily presented in any particular order and that performance of some or all of the operations in an alternative order(s) is possible and is contemplated. The operations have been presented in the demonstrated order for ease of description and illustration. Operations can be added, omitted, and/or performed simultaneously, without departing from the scope of the appended claims.

Some or all operations of the routines, and/or substantially equivalent operations, can be performed by execution of computer-executable instructions included on a computer-storage media, as defined herein. The term "computer-executable instructions," and variants thereof, as used in the description and claims, is used expansively herein to include routines, applications, application modules, program modules, programs, components, data structures, algorithms, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules can be implemented in software, in firmware, in special purpose digital logic, and any combination thereof. The operations of the routines are described herein below as being implemented, at least in part, by the feature ideator 114. One or more of the operations of the routines 700, 800, and the other operations described herein, can alternatively or additionally be implemented, at least in part, by other similarly configured components in the user device 102 or the server computer 104, even if not specifically designated in the figures.

FIG. 7 depicts an example feature ideation routine 700. At block 702, the feature ideator 114 receives a training set of data 118. In some examples, the training set of data 118 is labeled. The training set of data 118 can include the corpus of textual data used by the classifier 116. The training set of data 118 can be stored in a data store 120 or a remote data store 122, or combinations thereof. In some examples, the training set of data 118 can be part of a dictionary 124 of textual data stored in the remote data store 122.

At block 704, the classifier 116 generates at least one error associated with the training set of data 118. In some examples, the classifier 116 can analyze the training set of data 118. The classifier 116 can classify one or more terms of the training set of data 118. A difference between the classification of the one or more terms of the training set of data 118 provided by the classifier 116 and the classification of the training set of data 118 as labeled can represent an error. In some examples, the classifier 116 can be refined (i.e. trained) using features to reduce the number of errors.

At block 706, the candidate feature generator 128 determines at least one candidate feature based at least in part on the at least one error. In some examples, a candidate feature can include a term (word) that explains, defines, or otherwise represents an error generated by the classifier 116. The I/O controller 216 can provide an output to the user device 102 to cause the feature ideation user interface 132 to be displayed. The one or more candidate features can be displayed in a manner that provides for an increased usability of the feature ideator 114 by the user 128. For example, the summary generator 130 can generate a summary of the candidate features, which includes a selected number of the candidate features, for the user 128 to view rather than a complete listing of the candidate features.

At block 708, the I/O controller 216 causes the feature ideation user interface 330 to be rendered in the user interface 132. The feature ideation user interface 330 can be used to facilitate the interaction between the user 125 and the feature ideator 114 to generate and/or modify applied features.

At block 710, the feature ideator 114 receives a selection of at least one candidate feature from the user 125 apply the candidate feature as an applied feature. In some examples, the user 128 can be used as a source of information because of the potential for a vast amount of knowledge the user 128 can have that is not readily programmed in a machine learning environment. For example, the user 128 can be better equipped to disseminate between two similarly classified pages than the classifier 116.

At block 712, the feature ideator 114 retrains the classifier with the selected candidate feature. Once selected, the candidate feature can be applied to the classifier 116 as an applied feature. The classifier 116 can have one or more applied features as inputs to the classification process. The classifier 116 can be automatically retrained when a candidate feature is selected to be an applied feature. The classifier 116 can be retrained upon receiving a prompt for retraining. For example, the feature ideator 114 can be configured to wait until an input is received that a set of candidate features are to be applied as applied features. In these examples, a lower computing usage or reduced usage of network bandwidth can be attainable because the classifier is retrained in a batch mode (i.e. when a batch of candidate features is selected) rather than an individual mode (i.e. when each candidate feature is selected).

At block 714, the feature ideator 114 determines whether or not another candidate feature is to be generated. There can be instances in which it is determined that the training of the classifier 116 is complete. For example, the accuracy of the classifier 116 can be sufficient for the application of the classifier 116 of the model 126. In some examples, an input is received from the user 125 that indicates the accuracy of the classifier 116 is sufficient.

The accuracy of the classifier 116 can be determined using various technologies. In some examples, the accuracy of the classifier 116 can be a percentage of the data of the training set of data 118 accurately classified by the classifier 116 according to the labelling applied to the training set of data 118. As the number of errors in the classification by the classifier 116 decreases, the classifier 116 accuracy increases. If additional candidate features are desired, the routine 700 can continue to operation 704 and continue in the manner described above. If additional candidate features are not desired, the routine 700 can end at block 715. The routine 700 can be used in conjunction with a feature ideation user interface, such as the feature ideation user interface 132.

FIG. 8 is a flow diagram illustrating an example routine 800 for generating candidate terms for error and contrast portions of a user interface, such as the candidate features 344 or the contrast terms 350 rendered in the feature ideation user interface 330 of FIGS. 3-6.

At block 802, the feature ideator 114 determines a frequency of words occurring in any documents associated with an error or a contrast. In some examples, stop-words and words with three or fewer characters can be excluded. Although not limited to any particular definition, stop-words can be words that are extremely common and have little to no value in determining errors or contrast.

At block 804, the feature ideator 114 calculates the difference in frequency of the word between the errors and contrasts for each word analyzed in block 702.

At block 806, the candidate feature generator 128 selects as candidate features, or error terms the words with the largest positive difference calculated in block 804. In some examples, the number of words selected in operation 806 can be limited to a specific number, such as one hundred.

At block 808, the feature ideator 114 selects as contrast terms the words with the largest negative difference calculated in block 804. In some examples, the number of words selected in operation 808 can be limited to a specific number, such as one hundred.

At block 810, the feature ideator 114 calculates and evaluates, for each candidate word, the improvement in logarithmic loss (log-loss) which would be obtained if the word were used by itself to create a new feature.

At block 812, the feature ideator 114 ranks each list of candidate words by its accuracy improvement scores (for both errors and contrasts).

At block 814, the feature ideator 114 generates an output to cause a number of the top terms determined in operation 812 to be selected and displayed as either candidate features 344 or contrast terms 350. The routine 800 can thereafter end.

Example Clauses

A. A method of feature ideation, comprising: determining a plurality of errors in a training set of labeled textual data; determining a set of candidate features to correct at least one error of the plurality of errors; receiving a selection of at least one candidate feature of the set of candidate features to be an applied feature; and retraining a classifier based on the applied feature.

B. The method as paragraph A recites, wherein determining a plurality of errors in a training set of labeled textual data comprises: receiving a training set of data comprising a plurality of labeled textual data; and initiating the classifier to examine the labeled textual data to determine the plurality of errors.

C. The method as either paragraph A or B recites, further comprising deconstructing the plurality of labeled textual data into constituent components.

D. The method as any of paragraphs A-C recites, further comprising generating an error percent by determining a percentage of textual data identified correctly by the classifier.

E. The method as any of paragraphs A-D recites, further comprising: receiving a selection of at least one feature candidate of the set of feature candidates for further exploration; and presenting a plurality of words or n-grams associated with the selection of the at least one feature candidate of the set of feature candidates for further exploration.

F. The method as any of paragraphs A-E recites, further comprising rendering a featuring area comprising the applied feature.

G. The method as any of paragraphs A-F recites, further comprising: determining an updated plurality of errors in a training set of labeled textual data based on the applied feature; displaying a set of updated feature candidates based on the training set to correct at least one error of the updated plurality of errors; receiving a selection of at least one feature candidate of the updated set of feature candidates to be a second applied feature; and retraining a classifier based on the second applied feature.

H. The method as any of paragraphs A-G recites, further comprising updating the featuring area with a second set of candidate features determined by the classifier trained with the second applied feature.

I. The method as any of paragraphs A-H recites, further comprising displaying a frequency indicator proximate to at least one of the set of feature candidates, the frequency indicator indicating a frequency of occurrences in which the at least one of the set of feature candidates is associated with an error and a frequency of occurrences in which the at least one of the set of feature candidates is associated with a positive match or an estimated impact of adding the at least one of the set of feature candidates as the applied feature.

J. A computer-readable medium including computer-executable instructions to perform a method as any of paragraphs A-I recite.

K. A computer comprising: a processing unit; and a computer-readable medium including computer-executable instructions to perform a method as any of paragraphs A-I recite.

L. A system for feature ideation comprising: means for processing; means for determining a plurality of errors in a training set of labeled textual data; means for determining a set of candidate features to correct at least one error of the plurality of errors; means for receiving a selection of at least one candidate feature of the set of candidate features to be an applied feature; and means for retraining a classifier based on the applied feature.

M. The system as paragraph L recites, wherein the means for determining a plurality of errors in a training set of labeled textual data comprises: means for receiving a training set of data comprising a plurality of labeled textual data; and means for initiating the classifier to examine the labeled textual data to determine the plurality of errors.

N. The system as either paragraph L or M recites, further comprising means for deconstructing the plurality of labeled textual data into constituent components.

O. The system as any of paragraphs L-N recites, further comprising means for generating an error percent by determining a percentage of textual data identified correctly by the classifier.

P. The system as any of paragraphs L-O recites, further comprising: means for receiving a selection of at least one feature candidate of the set of feature candidates for further exploration; and means for presenting a plurality of words or n-grams associated with the selection of the at least one feature candidate of the set of feature candidates for further exploration.

Q. The system as any of paragraphs L-P recites, further comprising means for rendering a featuring area comprising the applied feature.

R. The system as any of paragraphs L-Q recites, further comprising: means for determining an updated plurality of errors in a training set of labeled textual data based on the applied feature; means for displaying a set of updated feature candidates based on the training set to correct at least one error of the updated plurality of errors; means for receiving a selection of at least one feature candidate of the updated set of feature candidates to be a second applied feature; and means for retraining a classifier based on the second applied feature.

S. The system as any of paragraphs L-R recites, further comprising means for updating the featuring area with a second set of candidate features determined by the classifier trained with the second applied feature.

T. The system as any of paragraphs L-S recites, further comprising means for displaying a frequency indicator proximate to at least one of the set of feature candidates, the frequency indicator indicating a frequency of occurrences in which the at least one of the set of feature candidates is associated with an error and a frequency of occurrences in which the at least one of the set of feature candidates is associated with a positive match or an estimated impact of adding the at least one of the set of feature candidates as the applied feature.

U. A computer, comprising: a processor; and a computer-readable medium in communication with the processor, the computer-readable medium comprising computer-executable instructions that, when executed by the processor, cause the processor to: initiate a classifier of a feature ideator to determine a plurality of errors in a training set of labeled textual data; initiate a candidate feature generator of the feature ideator to determine a set of feature candidates based on the training set to correct at least one error of the plurality of errors; and initiate the feature ideator to receive a selection of at least one feature candidate of the set of feature candidates to be an applied feature and to retrain the classifier based on the applied feature.

V. The computer of paragraph U, further comprising computer-executable instructions to: determine contrast terms that do not generate an error; and display the contrast terms.

W. The computer as either paragraph U or V recites, wherein the contrast terms displayed and the set of feature candidates displayed are summarized by computer-executable instructions to: obtain a frequency of words occurring as a potential member of the set of feature candidate and as a potential member of the plurality of contrast terms; calculate a difference in frequency between the occurrence of the words as a potential member of the set of feature candidate and as a potential member of the plurality of contrast terms; select a number of words occurring more often as errors as the feature candidates; and select a number of words occurring more often as contrasts as the contrast terms.

X. The computer as any of paragraphs U-W recites, further comprising computer-executable instructions to calculate an improvement score to be obtained if a selected feature candidate or a selected contrast term were used to create a new feature.

Y. The computer as any of paragraphs U-X recites, wherein the computer-executable instructions to calculate an improvement is performed using a logarithmic loss technique.

Z. The computer as any of paragraphs U-Y recites, further comprising computer-executable instructions to rank the feature candidates and the contrast terms by the improvement score associated with each of the feature candidates and the contrast terms.

AA. The computer as any of paragraphs U-Z recites, further comprising computer-executable instructions to display a number of the feature candidates having a certain improvement score as a set of feature candidates and a number of the contrast terms selected having a certain improvement score as the contrast terms.

AB. A computer-readable medium having computer-executable instructions thereupon that, when executed by a computer, cause the computer to: determine a plurality of errors associated with classifying a training set of data; determine a plurality of candidate features associated with at least one of the plurality of errors; and render a feature ideation user interface comprising: a featuring area comprising a create feature section for receiving an input to initiate a feature idealization process and an applied feature section for displaying currently applied features; a feature candidate section for displaying the candidate features; and a contrast term section for displaying contrast terms, the contrast terms comprising terms that are properly classified.

AC. The computer-readable medium of paragraph AB, wherein the feature ideation user interface further comprises a focus selection control configured to receive an input of which of the error type to apply to the candidate features displayed in the feature candidate section.

AD. The computer-readable medium as either paragraph AB or AC recites, wherein the feature ideation user interface further comprises a frequency indicator proximate to at least one of the candidate features or at least one of the contrast terms, the frequency indicator comprising a top bar having a certain length to indicate a frequency of the at least one of the candidate features or the at least one of the contrast terms in positive documents and a lower bar having a certain length that indicates a frequency of the at least one of the candidate features or the at least one of the contrast terms term in negative documents.

AE. The computer-readable medium as any of paragraphs AB-AD recites, wherein the feature ideation user interface further comprises an accuracy percentage indicator displaying an accuracy of the classifier.

AF. A computer comprising: a processing unit; and a computer-readable medium as any of paragraphs AB-AE recite.

CONCLUSION

Although the subject matter has been described in language specific to structural features and/or methodological acts, it is to be understood that the subject matter defined in the appended claims is not necessarily limited to the specific features or acts described. Rather, the specific features and steps are disclosed as example forms of implementing the claims.

All of the methods and processes described above can be embodied in, and fully automated via, software code modules executed by one or more general purpose computers or processors. The code modules can be stored in any type of computer-readable storage medium or other computer storage device. Some or all of the methods can alternatively be embodied in specialized computer hardware.

Conditional language such as, among others, "can," "could," "may" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A method for textual classification, comprising:
   receiving, by a processing unit, a training set of textual data;
   classifying, by the processing unit, the training set of textual data to obtain a first plurality of classifications for the training set of textual data;
   determining, by the processing unit, a plurality of errors based on differences between the first plurality of classifications and a first plurality of labels having been previously assigned to the training set of textual data;
   determining, by the processing unit, a set of candidate features based on the determined plurality of errors to correct at least one error of the plurality of errors;
   causing, by the processing unit, a display of one or more candidate features from the determined set of candidate features for selection as an applied feature;
   receiving, by the processing unit, a selection of at least one candidate feature of the displayed one or more candidate features to be an applied feature; and
   retraining a classifier, using the applied feature, to reclassify the training set of textual data.

2. The method of claim 1, wherein determining a plurality of errors in the training set of textual data comprises:
   receiving the training set of data comprising a plurality of labeled textual data; and
   initiating the classifier to examine the labeled textual data to determine the plurality of errors.

3. The method of claim 2, further comprising deconstructing the plurality of textual data into constituent components.

4. The method of claim 1, further comprising generating an error percent by determining a percentage of textual data identified correctly by the classifier.

5. The method of claim 1, further comprising:
   receiving a selection of at least one feature candidate of the set of feature candidates for further exploration; and
   presenting a plurality of words or n-grams associated with the selection of the at least one feature candidate of the set of feature candidates for further exploration.

6. The method of claim 1, further comprising rendering a featuring area comprising the applied feature.

7. The method of claim 1, further comprising:
   determining an updated plurality of errors in the training set of textual data based on the applied feature;
   displaying a set of updated feature candidates based on the training set to correct at least one error of the updated plurality of errors;
   receiving a selection of at least one feature candidate of the updated set of feature candidates to be a second applied feature; and
   retraining the classifier based on the second applied feature.

8. The method of claim 7, further comprising updating the featuring area with a second set of candidate features determined by the classifier trained with the second applied feature.

9. The method of claim 1, further comprising displaying a frequency indicator proximate to at least one of the set of feature candidates, the frequency indicator indicating a frequency of occurrences in which the at least one of the set of feature candidates is associated with an error and a frequency of occurrences in which the at least one of the set of feature candidates is associated with a positive match or an estimated impact of adding the at least one of the set of feature candidates as the applied feature.

10. A computer comprising:
    a processor; and
    a non-transitory, computer-readable storage medium in communication with the processor, the non-transitory, computer-readable storage medium comprising computer-executable instructions for textual classification that, when executed by the processor, cause the processor to:

initiate a classifier of a feature ideator to obtain a first plurality of classifications by classifying a training set of textual data;

initiate the classifier of the feature ideator to determine a plurality of errors in the training set of textual data based on differences between the first plurality of classifications and a first plurality of labels have been previously assigned to the training set of textual data;

initiate a candidate feature generator of the feature ideator to determine a set of feature candidates based on the determined plurality of errors to correct at least one error of the plurality of errors;

cause a display of one or more candidate features from the determined set of candidate features for selection as an applied feature;

initiate the feature ideator to receive a selection of the displayed one or more candidate features to be an applied feature and to retrain the classifier to re-classify the training set of textual data based on the applied feature.

11. The computer of claim 10, further comprising computer-executable instructions to:

determine contrast terms that do not generate an error; and display the contrast terms.

12. The computer of claim 11, wherein the contrast terms displayed and the set of feature candidates displayed are summarized by computer-executable instructions to:

obtain a frequency of words occurring as a potential member of the set of feature candidate and as a potential member of the plurality of contrast terms;

calculate a difference in frequency between the occurrence of the words as a potential member of the set of feature candidate and as a potential member of the plurality of contrast terms;

select a number of words occurring more often as errors as the feature candidates; and select a number of words occurring more often as contrasts as the contrast terms.

13. The computer of claim 12, further comprising computer-executable instructions to calculate an improvement score to be obtained if a selected feature candidate or a selected contrast term were used to create a new feature.

14. The computer of claim 13, wherein the computer-executable instructions to calculate an improvement is performed using a logarithmic loss technique.

15. The computer of claim 12, further comprising computer-executable instructions to rank the feature candidates and the contrast terms by the improvement score associated with each of the feature candidates and the contrast terms.

16. The computer of claim 15, further comprising computer-executable instructions to display a number of the feature candidates having a certain improvement score as a set of feature candidates and a number of the contrast terms selected having a certain improvement score as the contrast terms.

17. A non-transitory, computer-readable storage medium having computer-executable instructions for textual classification that, when executed by a computer, cause the computer to:

receive a training set of textual data;

classifying the training set of textual data to obtain a first plurality of classifications for the training set of textual data;

determine a plurality of errors based on the differences between the first plurality of classifications and a first plurality of labels having been previously assigned to the training set of textual data;

determine a plurality of candidate features based on the determined plurality of errors to correct at least one error of the plurality of errors;

render a feature ideation user interface comprising:

a featuring area comprising a create feature section for receiving an input to initiate a feature idealization process and an applied feature section for displaying currently applied features;

a feature candidate section for displaying the candidate features; and a contrast term section for displaying contrast terms, the contrast terms comprising terms that are properly classified; and retrain a classifier to re-classify the training set of textual data based on the contrast terms.

18. The non-transitory, computer-readable storage medium of claim 17, wherein the feature ideation user interface further comprises a focus selection control configured to receive an input of which of the error type to apply to the candidate features displayed in the feature candidate section.

19. The non-transitory, computer-readable storage medium of claim 17, wherein the feature ideation user interface further comprises a frequency indicator proximate to at least one of the candidate features or at least one of the contrast terms, the frequency indicator comprising a top bar having a certain length to indicate a frequency of the at least one of the candidate features or the at least one of the contrast terms in positive documents and a lower bar having a certain length that indicates a frequency of the at least one of the candidate features or the at least one of the contrast terms term in negative documents.

20. The non-transitory, computer-readable storage medium of claim 17, wherein the feature ideation user interface further comprises an accuracy percentage indicator displaying an accuracy of the classifier.

\* \* \* \* \*